United States Patent [19]
Fechtner et al.

[11] 4,181,418
[45] Jan. 1, 1980

[54] FILM SHEET CASSETTE

[75] Inventors: Harold F. Fechtner, Glen Farms, Md.; Bruce E. Owens, Loomis, Calif.

[73] Assignee: E. I. Du Pont de Nemours and Company, Wilmington, Del.

[21] Appl. No.: 928,192

[22] Filed: Jul. 26, 1978

Related U.S. Application Data

[63] Continuation-in-part of Ser. No. 741,037, Nov. 11, 1976, abandoned.

[51] Int. Cl.² ............................................. G03B 17/26
[52] U.S. Cl. .................................................. 354/277
[58] Field of Search ................................ 354/275–277, 354/281–283, 161, 203; 250/480; 355/72, 128

[56] References Cited

U.S. PATENT DOCUMENTS

| | | | |
|---|---|---|---|
| 773,382 | 10/1904 | Folmer | 354/277 |
| 2,455,814 | 12/1948 | Schwartz et al. | 354/281 |
| 3,784,835 | 1/1974 | Schmidt | 250/480 |

*Primary Examiner*—John Gonzales

[57] ABSTRACT

A film sheet cassette accommodates optical imaging by holding the edges of a film sheet between an apertured frame and a pressure plate. A cam arrangement permits the film to be released for loading and unloading through an end slot. The frame defines guide tracks for a slide plate that covers the aperture and prevents light access to the film when not in use.

7 Claims, 7 Drawing Figures

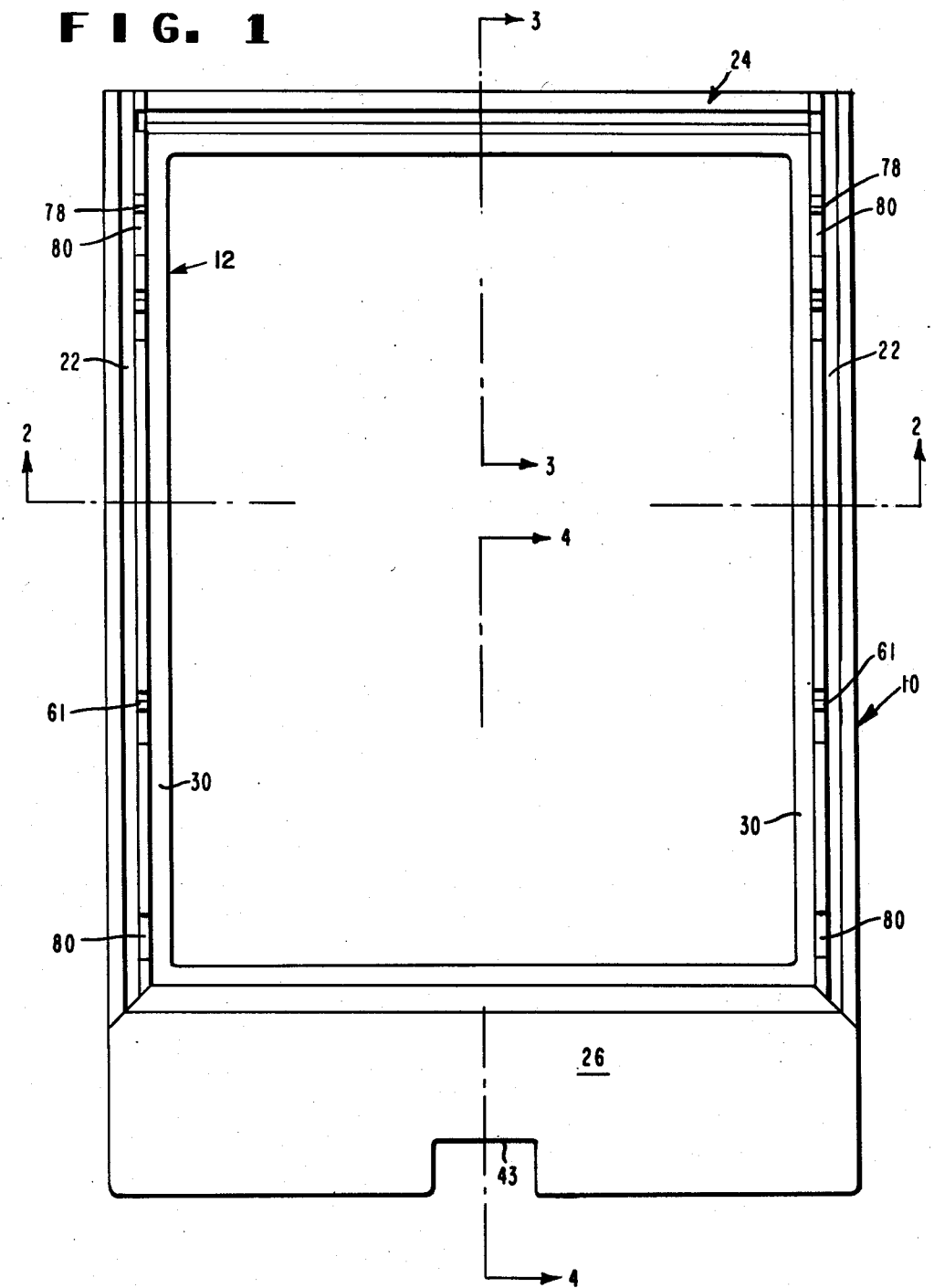

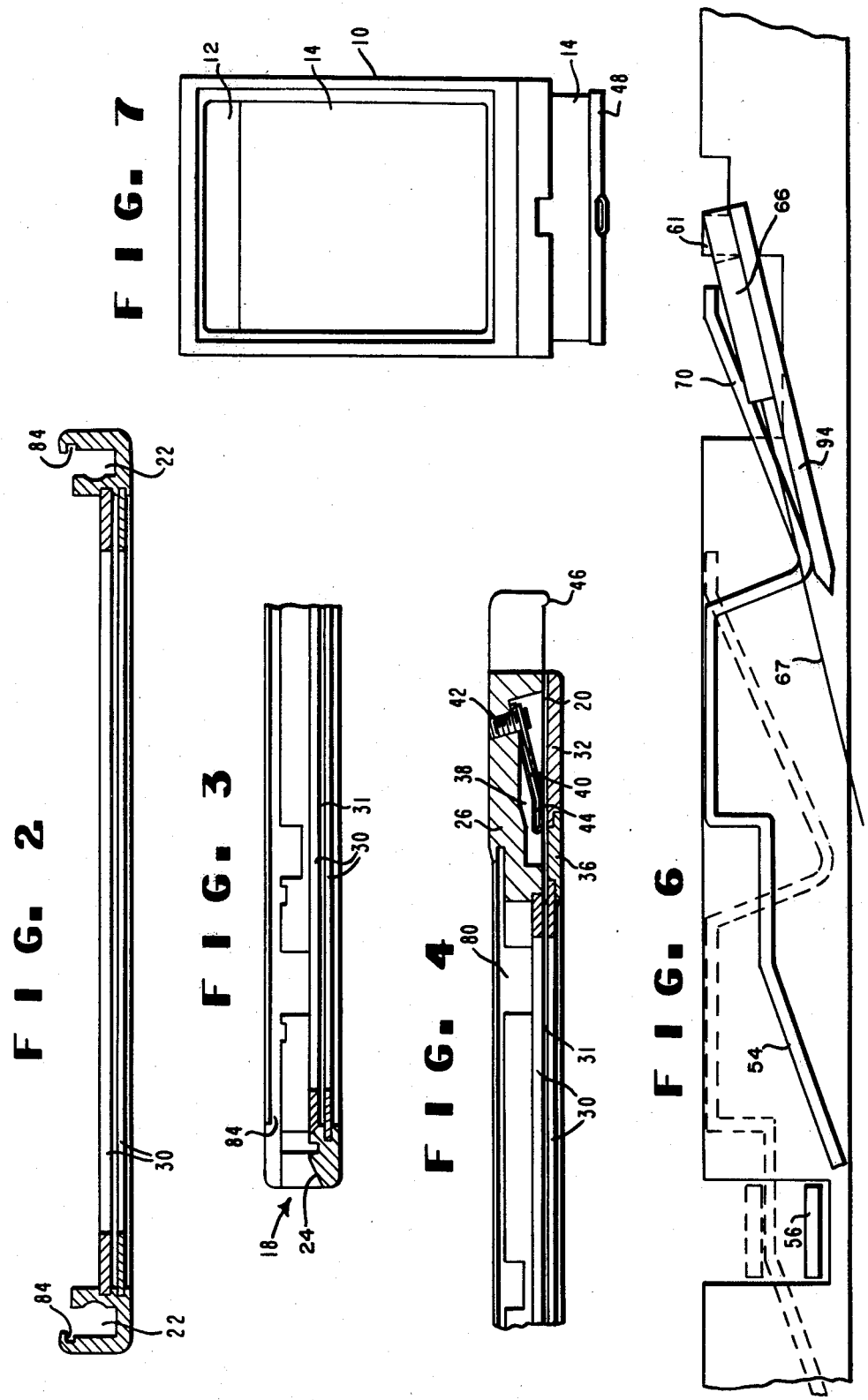

FILM SHEET CASSETTE

CROSS REFERENCE TO RELATED APPLICATION

This is a continuation-in-part of our copending application Ser. No. 741,037, filed Nov. 11, 1976, now abandoned.

BACKGROUND OF THE INVENTION

This invention relates to a film sheet cassette and, more particularly, to a cassette for handling film sheets under daylight conditions and facilitating their imaging.

There has been described in U.S. Pat. No. 3,784,835 issued Jan. 8, 1974 to Gunter Schmidt a film sheet cassette that is particularly useful in X-ray applications and permits the handling of film sheets under daylight conditions. The cassette comprises a housing having a front plate and a back plate in parallel spaced relationship. A pressure plate is disposed between the front plate and the back plate and resiliently urged against the front plate in lighttight relationship therewith. The cassette housing has channels formed along opposite edges thereof for slideably receiving cam rods. The pressure plate is provided with follower studs along the edges thereof which ride on cam surfaces of the rods. Actuating pins are provided on the cassette such that when they are depressed they engage the cam rods and cause them to slide within the channels such that the cam surfaces lift the follower studs and space the pressure plate from the front plate. This permits the film sheets to be inserted into or removed from the cassette.

While particularly unique and useful, Schmidt's cassette is adapted only for use with X-ray films. The front plate and pressure plate are coated with fluorescent materials which must be maintained in intimate contact with the film sheets to transfer X-ray images formed thereon to the film. In more recent years, it has become particularly desirable to use daylight cassettes with other film systems, particularly those used in medical applications such as axialtomography. In axialtomography, a computer analyzes plural X-ray scans and forms a picture which is presented on a television-like display. The picture developed on the television screen is then imaged, using a conventional camera, onto a film held in a cassette in the camera. After removal of the cassette from the camera, the film is withdrawn and developed. It would be particularly desirable to utilize a cassette in conjunction with such cameras that is capable of being handled under daylight conditions through the full cycle of loading with film and unloading.

It is therefore an object of this invention to provide a film sheet cassette capable of handling photographic films under daylight conditions.

Another object of this invention is to provide an improved film sheet cassette.

SUMMARY OF THE INVENTION

In accordance with a preferred embodiment of the invention, a film sheet cassette has a flat frame defining an entrance for, and an exposure aperture adapted to support the edges of, a film sheet in a fixed focal plane. A pressure plate bears resiliently against the frame to secure the edges of the film sheet. The pressure plate has at least one cam follower. A cam rod means defines at least one cam surface and is mounted on the frame for linear movement with respect thereto between first and second positions and with the cam surface engaging the cam follower. The cam surface is positioned and shaped to move the cam follower and hence the pressure plate away from the aperture as the cam rod means moves to its second position. A light shield disposed adjacent the film sheet entrance prevents the passage of light through the entrance to the aperture and pressure plate when the cam rod means is in its first position. The frame defines elongated guide tracks along the exposure aperture and an access slot. A slide plate is inserted through the access slot into the guide tracks for blocking the passage of light through the aperture.

In a particularly preferred embodiment, a detent is provided on the frame to retain the slide plate in a position blocking the aperture. Further, a light trap means is positioned in the access aperture to prevent the passage of light into the region contiguous the pressure plate. The light trap means is a flexible sheet, secured to the frame at said access aperture, yieldably engaging the slide plate. The flexible sheet is formed to have a plurality of individual fingers, each engaging a portion of the slide plate.

BRIEF DESCRIPTION OF THE DRAWINGS

FIG. 1 is a plan view of the frame of a film sheet cassette, the exposure aperture face down, constructed in accordance with a preferred embodiment of this invention;

FIG. 2 is a sectional view taken on the line 2—2 in FIG. 1;

FIG. 3 is a partial section view taken on line 3—3 in FIG. 1;

FIG. 4 is a partial sectional view taken on line 4—4 in FIG. 1;

FIG. 6 is a fragmentary side elevation view depicting the operation of a cam rod used in the cassette depicted in FIG. 5; and FIG. 7 is a pictorial representation of the cassette constructed in accordance with this invention showing the slide partially withdrawn.

DESCRIPTION OF THE PREFERRED EMBODIMENT

Figure 5:
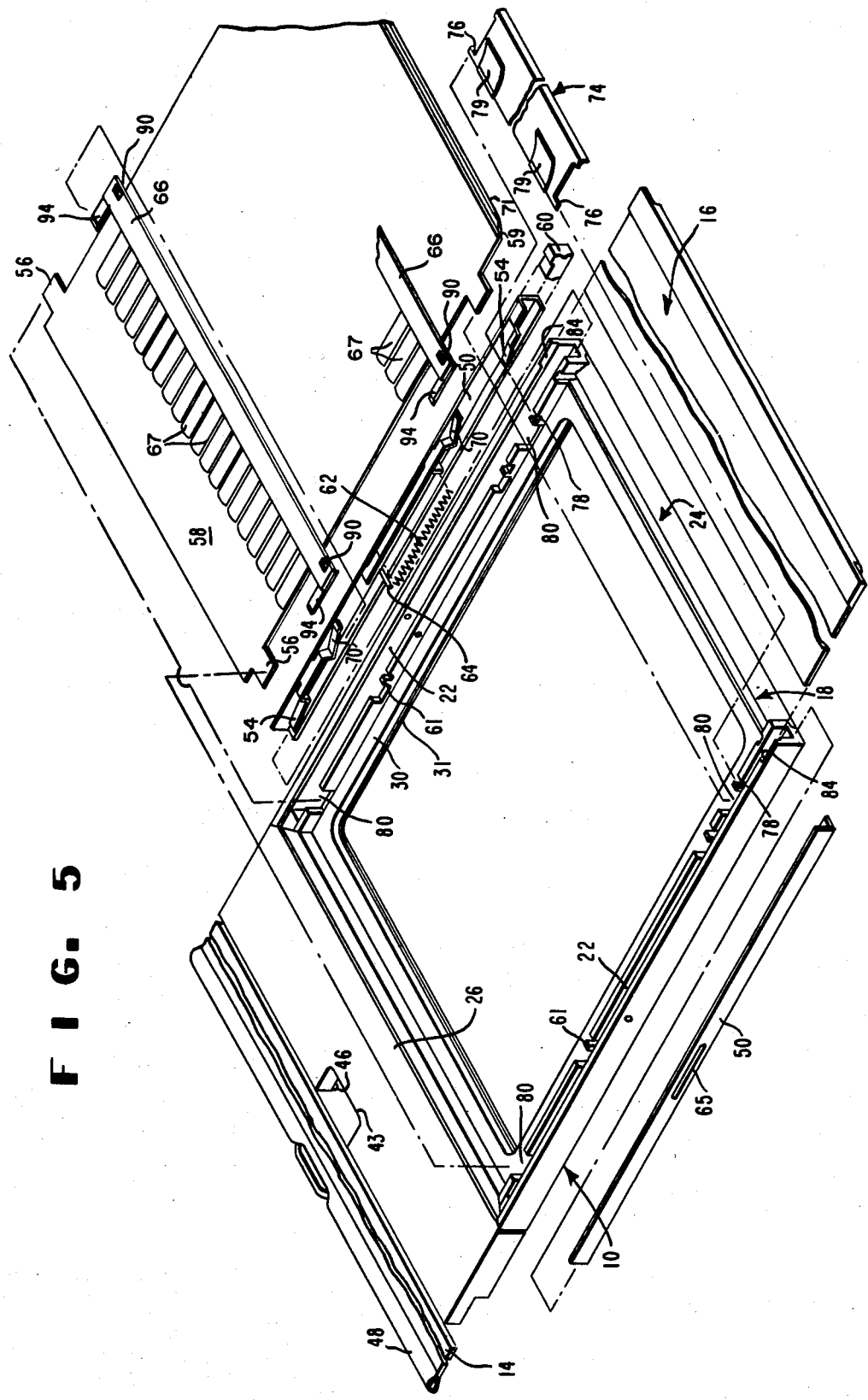
FIG. 5 is an exploded pictorial view of a film sheet cassette constructed in accordance with this invention using the frame of FIG. 1.

The illustrated cassette is adapted to receive and store photographic film sheets responsive to actinic radiation (light) from an automatic film dispenser of the type disclosed in U.S. Pat. No. 3,790,160 issued Feb. 5, 1974 to Gunter Schmidt. The dispenser is capable of being operated to open the envelope containing the film sheet stack and dispense the films individually into the cassette. The dispenser cooperates with the cassette to open the cassette and permit a film sheet to be dropped therein, after which, as the cassette is removed from the dispenser, it is again closed so as to be lighttight and permit the handling of the film under daylight conditions. The cassette is then placed in the back of a camera, a shield plate covering the exposure aperture removed, the film exposed, the shield plate replaced, and the cassette removed from the camera for further processing of the film. The cassette then may be inserted into a sheet film storage magazine of the type described, for example, in U.S. Pat. No. 3,715,087 issued Feb. 6, 1973, also to Gunter Schmidt. When the magazine has been attached to a processor, the stored sheets are discharged and processed. The advantage of the daylight system, of course, is that a darkroom need not be used to place the film into and remove it from the cassette. This results in a considerable time saving and is a real convenience.

The cassette disclosed herein includes a lighttight housing 10 which has an open exposure aperture or window 12, through which the film may be exposed to visible actinic radiation, a removable slide plate 14 adapted to block the window in a lighttight manner and a back plate 16. The housing has an entrance opening 18, through which the film may be inserted from the film dispenser, and an access opening or slot 20 through which the slide plate 14 may be withdrawn to permit exposure of the film.

The housing 10 includes a frame having U-shaped cam channels 22 on either side. A flared entrance opening piece 24 and an access cross-member 26 join the ends of channels 22. The access cross-member 26 and the entrance piece 24 are secured to channels 22 by suitable epoxy cement. Secured to the inner portion of the bottom edge (in the drawing) of the frame are two rectangular window frames 30. The window frames 30 define tracks 31 adapted to receive the slide plate 14 therein in a lighttight relationship. The bottom portion of the access cross-member 26 is sized to form, with a removable plate 32, the access slot 20 as well as continuations of the tracks 31. A fixed plate 36 is contiguous with the removable plate 32 and epoxied to the frame. These two plates 32 and 36 enclose a cavity 38 formed in the cross member 26 in which is mounted a light shield 40.

The light shield 40 may be a resilient, spring-like member formed, for example, of stainless steel, and secured to the access cross-member 26 as by screws 42. The resilient member 40 preferably is formed so as to have flexible fingers 44. The flexible fingers are particularly desirable in that they permit the light trap to contact the sliding plate 14 at a number of points across its width and the light trap does not become bowed or otherwise afford access of light to the cassette. The fingers preferably are covered with a sheet of opaque velvet or plush-like material of well-known type to facilitate the light seal. The frame at the access slot 20 has formed thereon a nib 46 which functions as a detent. The nib 46 is adapted to contact an enlarged handle 48 formed on one edge of the slide plate 14 to facilitate its withdrawal. Such contact holds the slide plate in position securely so that it does not inadvertently fall out.

To complete the description of the frame, cam rods 50, which may be formed out of sheet metal, are L-shaped in cross section and adapted to slide within the cam channels 22. Cam surfaces 54 which, as will be described, are adapted to engage cam follower tabs 56 on the pressure plate 58, are similarly formed of sheet metal and welded or suitably attached to the cam rods. The ends of the cam rods 50 contiguous the entrance opening 18 have pins 60 (FIG. 5) inserted in a U-shaped receptacle formed in the cam rods to permit the cam rods to be actuated by mating pins (not shown) in the film sheet dispenser or magazine. The inner walls of the cam channels 22 are appropriately cut away at 80 to permit the tabs 56 to be slideably inserted therein and to provide pivot studs 61 for a pair of strips 66 that are provided with spring fingers 67. Fingers 67 normally bear against pressure plate 58 and hold it against frame 30. Strips 66 pivot about studs 61 when cam rods 50 are actuated. Compression springs 62 are positioned in the cam rods 50, and are retained at one end by a tab (not shown) on the cam rods 50. Pins 64 are insertable through the cam channels 22 and through slots 65 formed in the cam rod 50 to secure the remaining ends of the springs 62. Thus, when the cam rods are actuated, the springs compress.

The cam surfaces 54 include pressure plate actuating surfaces 70 positioned to engage arms 94 at the ends of strips 66. When so engaged, the spring fingers 67 hold pressure plate 58 against frame 30. The spring strips 66 have apertures 90 at either end which are adapted to fit over the studs 61 formed in the cam channels 22 so as to provide pivot points.

As best shown in FIG. 6, cam surfaces 54 engage follower tabs 56 and move pressure plate 58 away from frame 30 when the cam rods are actuated. In addition, a light-trap strip 74 (FIG. 5) has end tabs or pins 76 adapted to engage notches or slots 78 formed in the cam channels 22 such that the light-trap strip may pivot between open and closed positions, thereby opening and closing the entrance opening 18 against light.

The light-trap 74 is operated by the movement of the pressure plate and has spring tabs 79 which engage back plate 16 and urge the light-trap 74 normally to a closed position bearing against flared piece 24 until it is opened by the movement of the pressure plate to an open position (away from the window frame). The pressure plate 58 has the cam follower tabs 56 adapted to move within the limits of slots 80 in the cam channels 22. The pressure plate 58 is covered with a surface 59 on the film contact side that cooperates with the back surface of a film sheet to provide an air layer between the film and the surface. The surface also should be non-electrostatic such that the film may slide freely across the surface of the pressure plate and will, when the cassette is turned on end, drop freely out of or into the cassette when the pressure plate is opened.

Such a surface may be made by adhering polyester film to the film side of the pressure plate and coating the film with a suspension that forms a stippled surface. The coating may be made by suspending silicon beads of about 1 mil diameter in a cellulose acetate solution. A suitable black dye is added to reduce the tendency toward light piping between the film back and the surface. The beads comprise about 1-2% by volume. The suspension is applied to the film on the pressure plate and allowed to dry. Thus, the back of the film sheet never makes absolutely flat contact with the surface of the pressure plate and such difficulties as entrapment of air in small pockets, sticking of the film sheet and difficult release are avoided. The surface 59 is formed so that its film backing extends slightly beyond the end of the pressure plate and is bent back as at 71 to form together with the piece 24 (FIG. 3) of the frame a flared opening for the film sheet.

The reverse side of the frame is adapted to receive a backing plate 16 slideably therewith to complete the overall enclosure. For this purpose, the back plate 16 is adapted to slide in grooves 84 formed in the cam channels 22. The member 26 is notched as at 43 to permit the slide plate 14 to be withdrawn by gripping its handle 48.

In use, the pressure plate 58 normally engages the window frame 30 so as to secure a film sheet (not shown) at its edges. The pressure plate engages the frame due to the action of the compression springs 62, urging the cam rods 50 toward the entrance opening 18 of the housing 10. This ensures that the cam surfaces 54 are disengaged from the cam follower tabs 56 (FIG. 6) and that the cam surfaces 70 engage the cam follower arms 94 and pivot the fingers 67 against the back of the pressure plate 58. At the same time, the light-trap 74 is pivoted by the springs 79 to close the entrance opening 18 to light. At this moment, the spring strips 40 (FIG. 4) engage the slide plate 14 to prevent light from entering the interior of the cassette in the region between the pressure plate and window through that route.

The cassette is now placed into the back portion of a camera for exposure and the slide plate 14 is withdrawn past the detent nib 46. As the slide plate is withdrawn, the resilient strip 40 properly closes the opening to prevent light from entering the cassette. The action of the individual fingers ensures that no light is able to escape around the edges and across the surface of the slide plate as it is withdrawn.

Following exposure, the reverse procedure is followed. The slide plate is re-introduced past the nib 46 into the access opening 20 so as to close off the window and protect the exposed film sheet against light. The fact that during exposure the film is able to rest against the pressure plate and is firmly held at all edges, tends to hold the film sheet, even though it be relatively thin, in the focal plane of the optics of the camera. The retention of focal plane holds even though the cassette is turned with the film side down. In short, the cassette may be positioned in any orientation and still find advantageous use.

After the exposure and with the slide plate back in position, the cassette may be withdrawn from the camera and introduced into a film magazine of the type described by Schmidt. When it is introduced into this magazine, release pins (not shown) engage the pins 60 such that they are depressed into the cassette. This compresses the springs 62 and moves the cam surfaces 70, 54 so as to remove the pressure of the spring strip 66 against the pressure plate and lift the pressure plate away from contact with the window edges. Upward movement of the pressure plate causes the light-trap 74 to pivot upwardly, tensioning its leaf springs, and pivotally opens the light-trap 74 at the entrance opening 18. With the cassette in a vertical orientation, with the entrance opening down, the film sheet slides freely out of the cassette across the air layer on the surface of the pressure plate.

The pressure plate itself is released particularly by the movement of cam surfaces 70, 54 to the broken line positions shown in FIG. 6. Cam surface 70 moves away from contact with the spring strip cam follower arms 94 and the lifting cam 54 engages the tabs 56, causing them to be lifted to the position represented by the broken lines in FIG. 6, thereby lifting the pressure plate away from contact with the window. It is thus seen to be a double action of release and positive action of the cam surface which lifts the pressure plate and opens the cassette. When the cassette is to be reloaded, it is placed entrance opening up, as described by Schmidt, in a dispenser. The pins are again depressed, opening the entrance opening 18, and a film sheet dropped into the cassette by the dispenser, all under daylight conditions. Upon removal from the dispenser, the pins are released and the cassette is again ready for use.

The resulting cassette is a low-cost unit which is easily constructed and yet provides a sure lighttight seal for the interior contents of the cassette. The individual resilient fingers on the light-trap permit the ready removal of the slide plate 14 for taking pictures. The stippled, non-electrostatic surface of the pressure plate ensures an air layer and free slidability of the film for removal and withdrawal of the film sheet. The film sheet is releasably and firmly held by its edges in the desired focal plane.

We claim:

1. A cassette comprising:
    a frame defining at one end an entrance for a film sheet and in one side an exposure aperture,
    a pressure plate,
    spring means engaging the pressure plate for holding it against the frame to hold all edges of a film sheet over said aperture,
    said pressure plate having at least one cam follower,
    cam rod means defining at least one cam surface,
    means mounting the cam rod means on the frame for linear movement with respect thereto between first and second positions,
    said cam surface being positioned and shaped to move the cam follower and hence said pressure plate away from the aperture as the cam rod means moves to its second position,
    a light shield disposed adjacent said film sheet entrance for preventing the passage of light through said entrance when said cam rod means is in its first position,
    said frame defining elongated guide tracks along the sides of said exposure aperture and an access slot at its other end, and
    a slide plate adapted to be slideably insertable through said access slot into said guide tracks for blocking the passage of light through said aperture.

2. A cassette as set forth in claim 1 wherein said frame includes a detent adapted to retain said slide plate in a position blocking said exposure aperture and wherein said pressure plate has surface means providing at least a partial air layer between it and a film sheet.

3. A cassette as set forth in claim 2 which also includes light trap means for preventing the passage of light into the region contiguous to said pressure plate through said access slot.

4. A cassette as set forth in claim 3 wherein said light trap means includes a spring member secured to said frame at said access slot yieldably engaging said slide plate.

5. A cassette as set forth in claim 4 wherein said spring member defines a plurality of individual tabs engaging said slide plate.

6. A cassette as set forth in claim 1 which also includes light trap means for preventing the passage of light into the region contiguous to said pressure plate through said access slot.

7. A cassette as set forth in claim 1 wherein said pressure plate has surface means providing at least a partial air layer between a film sheet and said pressure plate to facilitate sliding movement of a film sheet into and out of said cassette.

* * * * *